United States Patent
Lagerlöf

(10) Patent No.: US 10,280,818 B2
(45) Date of Patent: May 7, 2019

(54) FLUID CONTROL VALVE

(71) Applicant: VOLVO TRUCK CORPORATION, Göteborg (SE)

(72) Inventor: Fredrik Lagerlöf, Stenkullen (SE)

(73) Assignee: Volvo Truck Corporation, Göteborg (SE)

( * ) Notice: Subject to any disclaimer, the term of this patent is extended or adjusted under 35 U.S.C. 154(b) by 80 days.

(21) Appl. No.: 15/307,692

(22) PCT Filed: May 12, 2014

(86) PCT No.: PCT/EP2014/001266
§ 371 (c)(1),
(2) Date: Oct. 28, 2016

(87) PCT Pub. No.: WO2015/172792
PCT Pub. Date: Nov. 19, 2015

(65) Prior Publication Data
US 2017/0051644 A1 Feb. 23, 2017

(51) Int. Cl.
*F16K 31/42* (2006.01)
*F01M 5/00* (2006.01)
(Continued)

(52) U.S. Cl.
CPC ............... *F01M 5/005* (2013.01); *F01P 7/14* (2013.01); *F01P 7/165* (2013.01); *F16K 1/126* (2013.01);
(Continued)

(58) Field of Classification Search
CPC ...... F01M 5/005; F01P 2007/146; F01P 7/14; F01P 7/165; F16K 11/07; F16K 11/08;
(Continued)

(56) References Cited

U.S. PATENT DOCUMENTS 1,248,777 A * 12/1917 Ahlheim ............... F16K 31/404
251/38
2,566,173 A * 8/1951 Dillman .............. F24D 19/1024
137/625.5
(Continued)

FOREIGN PATENT DOCUMENTS

DE 82 08 048 U1 6/1982
DE 10 2009 014050 A1 9/2010
(Continued)

OTHER PUBLICATIONS

International Search Report (dated Oct. 16, 2014) for corresponding International App. PCT/EP2014/001266.
(Continued)

*Primary Examiner* — William M McCalister
(74) *Attorney, Agent, or Firm* — WRB-IP LLP

(57) ABSTRACT

A fluid control valve includes a cylindrical housing with at least one opening through a housing wall, a cylindrical main valve axially movably arranged inside the housing for controlling a fluid flow through the at least one opening and a main valve spring member acting on the main valve. The main valve includes a base wall defining a fluid control volume and fluid main volume in the cylindrical housing. The base wall includes an opening for fluidly connecting the fluid control volume with the fluid main volume. The fluid control valve further includes a pilot valve positioned at the base wall opening, which pilot valve is moveably arranged for controlling a fluid flow through the base wall opening, and an electro-mechanical actuator configured to act on the pilot valve for controlling the main valve via the pilot valve. A method for adjusting the axial position of a cylindrical main valve of a fluid control valve is also provided.

31 Claims, 5 Drawing Sheets

(51) Int. Cl.
  F16K 31/12    (2006.01)
  F16K 3/24     (2006.01)
  F16K 3/26     (2006.01)
  F16K 11/07    (2006.01)
  F16K 27/04    (2006.01)
  F01P 7/16     (2006.01)
  F01P 7/14     (2006.01)
  F16K 1/12     (2006.01)
  F16K 31/122   (2006.01)
  F28F 27/02    (2006.01)

(52) U.S. Cl.
  CPC ............... *F16K 3/24* (2013.01); *F16K 3/26* (2013.01); *F16K 3/262* (2013.01); *F16K 3/267* (2013.01); *F16K 11/07* (2013.01); *F16K 27/041* (2013.01); *F16K 27/048* (2013.01); *F16K 31/12* (2013.01); *F16K 31/1221* (2013.01); *F16K 31/42* (2013.01); *F16K 31/426* (2013.01); *F28F 27/02* (2013.01); *F01P 2007/146* (2013.01)

(58) Field of Classification Search
  CPC .......... F16K 1/126; F16K 1/041; F16K 1/048;
       F16K 31/12; F16K 31/1221; F16K
       31/124; F16K 31/42; F16K 31/426; F16K
       3/22; F16K 3/24; F16K 3/26; F16K
       3/262; F16K 3/267; F28F 27/02
  USPC ..... 137/489.5, 490; 236/34, 34.5, 100, 35.5;
       123/41.04, 41.1
  See application file for complete search history.

(56)         References Cited

U.S. PATENT DOCUMENTS

| | | | | | |
|---|---|---|---|---|---|
| 2,965,132 | A | * | 12/1960 | Couffer, Jr. | D06F 3/10 137/625.64 |
| 3,002,532 | A | * | 10/1961 | Carlson | F16K 31/426 137/625.66 |
| 3,033,228 | A | * | 5/1962 | Mohler | F16K 31/408 137/490 |
| 3,155,366 | A | * | 11/1964 | Rasmussen | F16K 31/404 137/490 |
| 3,667,722 | A | * | 6/1972 | Katz | F16K 31/10 251/129.08 |
| 3,903,914 | A | * | 9/1975 | Topham-Clements | F16K 1/303 137/601.13 |
| 4,055,298 | A | * | 10/1977 | Wilson | G05D 23/1333 123/41.09 |
| 4,150,695 | A | * | 4/1979 | Kosugui | F16K 31/426 137/625.64 |
| 4,176,688 | A | * | 12/1979 | Schwerin | F16K 15/186 137/630.13 |
| 4,444,215 | A | * | 4/1984 | Zukausky | G05D 23/1313 137/490 |
| 4,445,528 | A | * | 5/1984 | Miki | F16K 31/426 137/315.03 |
| 4,464,977 | A | * | 8/1984 | Brundage | F15B 9/03 137/528 |
| 5,000,220 | A | * | 3/1991 | Eick | G05D 7/005 137/501 |
| 5,238,185 | A | * | 8/1993 | Saur | G05D 23/1852 236/34.5 |
| 5,339,857 | A | * | 8/1994 | Scallan | F16K 31/383 251/38 |
| 5,645,263 | A | * | 7/1997 | Aardema | F15B 13/0405 137/487.5 |
| 6,220,288 | B1 | * | 4/2001 | Sandau | F15B 11/003 137/596.17 |
| 6,742,716 | B1 | * | 6/2004 | Duprez | F01P 7/167 236/34.5 |
| 8,978,992 | B2 | * | 3/2015 | Zillig | F15B 21/042 137/468 |
| 9,453,455 | B2 | * | 9/2016 | Lewis | F01P 7/16 |
| 2002/0047050 | A1 | * | 4/2002 | Leu | G05D 23/1393 236/12.16 |
| 2003/0150923 | A1 | * | 8/2003 | Leu | F01P 7/167 236/34.5 |
| 2011/0162595 | A1 | * | 7/2011 | Traudt | F01P 7/14 123/41.1 |
| 2013/0292588 | A1 | | 11/2013 | Krug et al. | |

FOREIGN PATENT DOCUMENTS

| | | |
|---|---|---|
| DE | 202012003969 U1 | 5/2012 |
| EP | 0 138 618 A2 | 4/1985 |
| EP | 1186783 A2 | 3/2002 |
| JP | S61-131580 | 8/1986 |
| JP | 01208676 | 8/1989 |
| JP | H03026879 | 3/1991 |
| JP | H04030376 | 3/1992 |
| JP | 2002089517 | 3/2002 |
| JP | 2004-053192 | 2/2004 |
| JP | 2007-046786 | 2/2007 |
| JP | 2011252541 | 12/2011 |

OTHER PUBLICATIONS

European Official Action (dated Sep. 3, 2018) for corresponding European App. 14741193.8.
Japanese Official Action (dated Oct. 16, 2018) for corresponding Japanese App. 2016-567083.

* cited by examiner

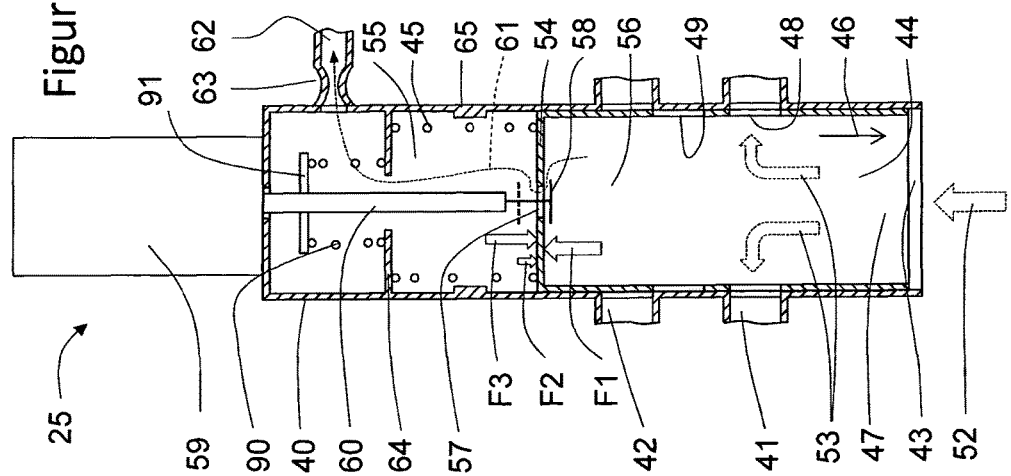
Figure 10
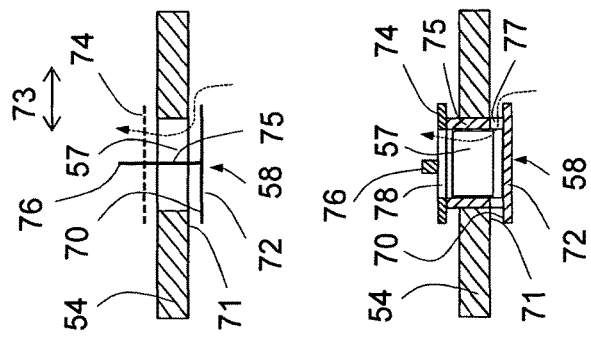
Figure 7
Figure 8
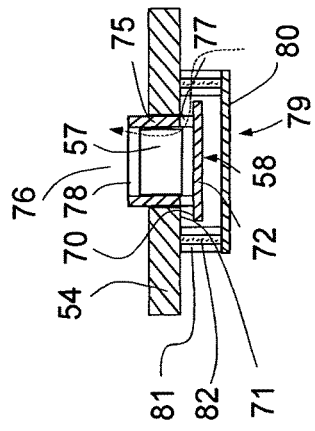
Figure 9

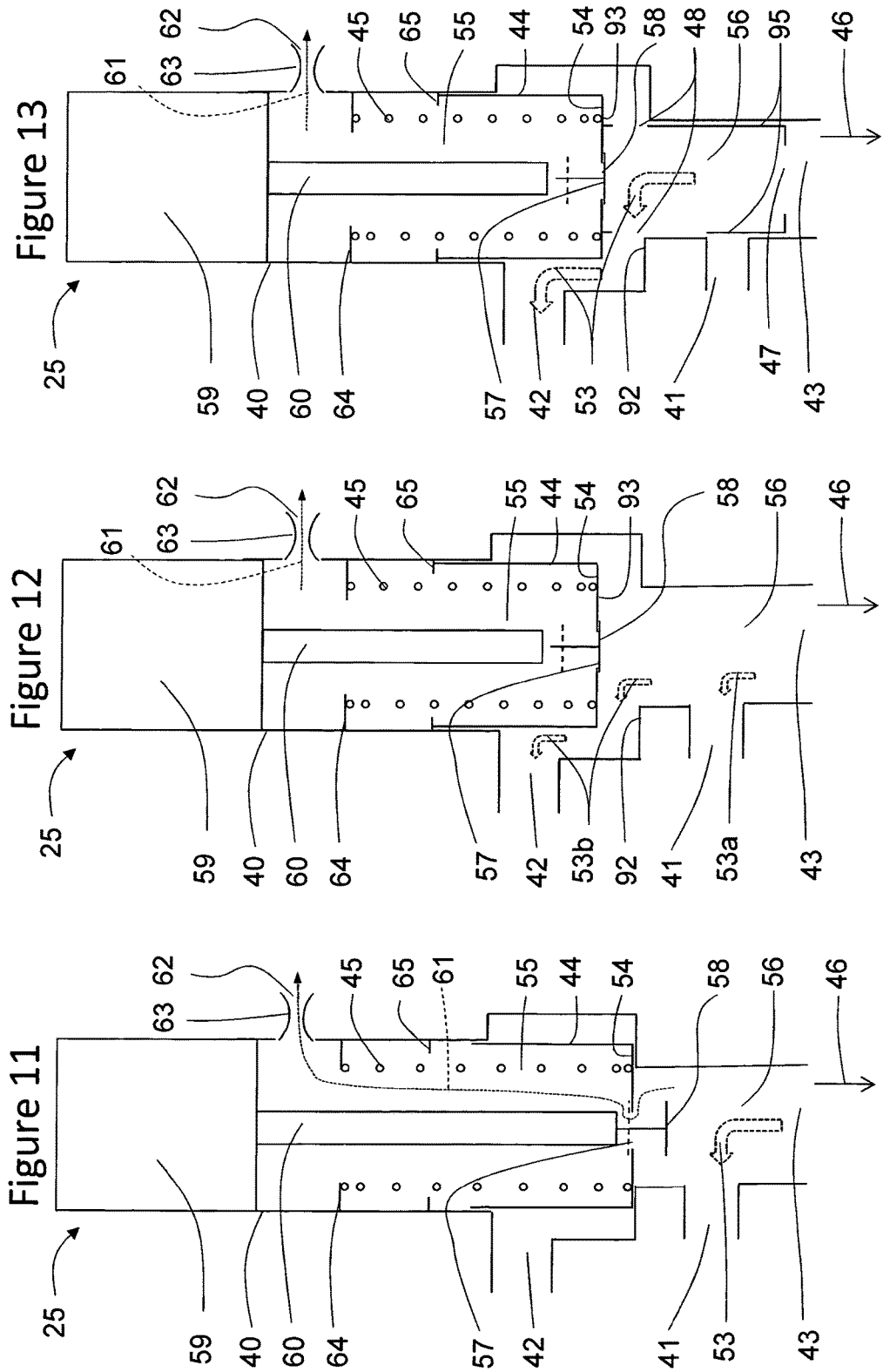

FLUID CONTROL VALVE

BACKGROUND AND SUMMARY

The invention relates to a fluid control valve comprising a cylindrical housing with at least one opening through a housing wall, a cylindrical main valve axially movably arranged inside the housing for controlling a fluid flow through the at least one opening and a main valve spring member acting on the main valve. The invention also relates to a heat exchange system comprising a heat exchange fluid circuit having a heat source, a heat exchanger, a heat exchanger by-pass, a fluid pump and a fluid control valve, as well as a method for adjusting the axial position of a cylindrical main valve of a fluid control valve.

The fluid control valve according to the invention is particularly suitable as flow control valve in heat exchange systems having a heat exchanger device and a bypass line, where the fluid control valve according to the invention is arranged to control the ratio of flow through the heat exchanger device and bypass line. The heat exchange system may be used together with any type of heat source, in particular combustion engines, such as combustion engine for heavy-duty vehicles, such as trucks, buses and construction equipment. Although the invention will be described mainly with respect to a combustion engine for a truck, the invention is not restricted to this particular type of heat source, application or vehicle, but may also be used in heat exchange systems for other heat sources, such as electrical machines, electrical storage systems, hydraulic systems and components, and the like.

There is a continuous effort for reducing fuel consumption of combustion engines. One parameter affecting fuel consumption is the internal resistance within the engine and transmission, and this internal resistance is a function of the viscosity of the lubrication oil within the combustion engine. Low viscosity oil means less resistance but too low viscosity results in reduced lubrication performance, increased wear, reduced lifetime and potential engine damages. Oil viscosity of directly affected be the temperature of the oil, and lubrication oil providers provides detailed information about the maximal allowed oil temperature for a certain lubrication performance. There is consequently a desire by combustion engine providers to control the oil temperature to lie as close as possible to the maximal allowed temperature limit without exceeding said limit. The temperature of the oil within a combustion engine is typically controlled by an oil heat exchange system having oil heat exchanger, an oil heat exchanger bypass, an oil pump and flow control valve. The flow control valve controls the level of flow flowing through the oil heat exchanger and the level of flow flowing through an oil heat exchanger bypass, thereby controlling the overall oil temperature. Conventional fluid control valves for heat exchange system, such as shown in US2013068322, typically rely on a heat element that expands when heated. The heat element, such as wax, is connected to a valve member to actuate the valve position depending on the surrounding heat. This conventional technology for controlling the oil temperature is however not particularly reliable and reacts slowly to changes in incoming oil temperature, Consequently, engine provider are forced to set the oil operating temperature relatively low for the purpose of providing a sufficiently large temperature safety range up to the maximal allowed oil temperature, thereby automatically also operating the engine with an unnecessary high level of internal friction. There is thus a need for a new fluid control valve that reacts faster and that can control the flow with an improved accuracy while maintaining a low cost.

It is desirable to provide a fluid control valve that solves the above-mentioned problem.

The first aspect of the invention concerns a fluid control valve comprising a cylindrical housing with at least one opening through a housing wall, a cylindrical main valve axially movably arranged inside the housing for controlling a fluid flow through the at least one opening and a main valve spring member acting on the main valve. The invention is characterized in that the main valve comprises a base wall defining a fluid control volume and fluid main volume in the cylindrical housing, the base wall comprises an opening for fluidly connecting the fluid control volume with the fluid main volume, and the fluid control valve further comprises:

a pilot valve positioned at the base wall opening, which pilot valve is moveably arranged for controlling a fluid flow through the base wall opening; and an electro-mechanical actuator configured to act on the pilot valve for controlling the main valve via the pilot valve.

It is also desirable to provide a method for adjusting the axial position of a cylindrical main valve of a fluid control valve that solves at least partly the above-mentioned problem.

The fluid control valve comprises a cylindrical housing with at least one opening through a housing wall, and the cylindrical main valve is axially movably arranged inside the housing for controlling a fluid flow through the at least one opening. The inventive method comprises at least one of the steps of extending an actuator piston of an electro-mechanical actuator in a first axial direction for pushing a pilot valve in an opening direction, thereby enabling increased flow of relatively high-pressure fluid to enter a control volume causing the combined axial forces acting on the cylindrical main valve in the first axial direction to exceed the axial force acting in a direction opposite the first axial direction, such that the cylindrical main valve moves in the first axial direction; and retracting the actuator piston of an electro-mechanical actuator in a direction opposite the first axial direction for enabling the pilot valve to move in a closing direction, thereby decreasing the fluid pressure within the control volume due to a drain flow out of the control volume, causing the axial force acting on the cylindrical main valve in a direction opposite the first axial direction to exceed the combined axial forces acting in the first axial direction, such that the cylindrical main valve moves in the direction opposite the first axial direction.

The fluid control valve according to the first aspect of the invention and the method according to the second aspect of the invention solve the above-mention problem by means of the pilot valve that is configured to control the position of the main valve, and controlling the position of the pilot valve by means of the electro-mechanical actuator. The use of an electro-mechanical actuator for controlling the position of the main valve enables a much faster actuation and reaction time compared with a more conventional heat element actuating means. The electro-mechanical actuator is normally controlled by an electronic control unit that receives information about current fluid temperature from one or more sensors. A software control system of the electronic control unit may be used for generating proper control signals to the fluid control valve for maintaining the fluid temperature at a target temperature without excessive deviation. The pilot valve—main valve configuration of the inventive fluid control valve enables high position accuracy of the main valve by use of the fluid pressure as actuating means for controlling the position of the main valve. The electro-mechanical actuator can generally generate a relatively low actuating force, thereby making the actual position of a piston of the actuator uncertain when operating directly on the main valve, due to the relatively high forces acting on the main valve, such as the fluid pressure, main valve spring member and main valve sliding friction. By provision of a pilot valve that controls the position of the main valve by use of the fluid pressure, a more accurate and fast control is provided because much less force is exerted on the pilot valve, thereby making it more easily to control the position of the pilot valve. The position of the pilot valve subsequently controls the flow through the base wall opening, and consequently also the pressure within the fluid control volume, thereby controlling the position of the main valve. The axial position of the piston of the electromechanical actuator may be either estimated based on the control signal transmitted to the electro-mechanical actuator, or measured by a sensing device. The axial position of the main valve can be accurately determined based on the axial position of the piston of the electro-mechanical actuator due to the self-regulating position control of the main valve caused by the axially free floating condition of the main valve in combination with the pilot valve and drain outlet.

According to an embodiment, the cylindrical housing comprises a fluid drain outlet for draining fluid from the control volume. The main force acting on the main valve in a direction towards the fluid control volume is the fluid pressure within the fluid main volume, which fluid pressure is based on the fluid pressure generated by the fluid pump. The main force acting on the main valve in a direction away from the fluid control volume is the fluid pressure within the fluid control volume and the force exerted by the main valve spring member. The fluid drain outlet enables, when connected to a fluid reservoir having a relatively low pressure and with a restricted inflow of high pressure fluid thought the base wall opening, a drain of fluid out from the fluid control volume and thus a reduction in fluid pressure within the fluid control volume. A reduced fluid pressure within the fluid control volume results is an adjustment of the force equilibrium of the main valve, thereby resulting in an adjustment of the axial position of the main valve.

According to an embodiment, the main valve spring member is configured to urge the main valve in a first axial direction away from the fluid control volume. The main valve spring member urging the main valve away from the fluid control volume is an important factor of the force equilibrium of the main valve, and enables displacement of the main valve in the first direction.

According to an embodiment, the pilot valve is moveably arranged for controlling a fluid flow through the base wall opening from the fluid main volume to the fluid control volume. By controlling the position of the pilot valve the level of fluid entering the fluid control volume can be controlled, and thereby also the fluid pressure within the fluid control volume.

According to an embodiment, the electro-mechanical actuator comprises an actuator piston configured such that an axial position of the actuator piston indirectly controls the axial position of the main valve. By controlling the position of the main valve indirectly, the force performance of the actuator may be reduced, thereby enabling use of low-cost actuator.

According to an embodiment, the main valve is configured to be axially free floating, wherein the axial position of the main valve is determined by a force equilibrium position resulting from the accumulated axial forces acting on the main valve. This has the advantage of enabling reduced power performance requirement of the used actuator, such that a more low-cost actuator may be used.

According to an embodiment, the fluid control valve is configured so that the main axial forces acting on the main valve in a first axial direction during operation of the fluid control valve comprises the axial force provided by the main valve spring member and an axial force generated by the fluid pressure in the control volume. This has the advantage of enabling a variable total force in the first axial direction, which total force can be adjusted to a level both lower and higher than the force exerted by the fluid pressure in the fluid main volume.

According to an embodiment, the fluid control valve is configured so that the main axial force acting on the main valve in a direction opposite a first axial direction is the axial force generated by the fluid pressure in the main volume.

According to an embodiment, fluid control valve is configured so that the main axial force or forces acting on the main valve in any single axial direction constitute at least 75% of the total axial forces acting on the main valve in said axial direction, specifically at least 85% of the total axial forces, and more specifically at least 95% of the total axial forces. Additional axial forces may act on the main valve in certain situations, such as frictional forces. These additional forces are however generally relatively low.

According to an embodiment, the pilot valve comprises a circular sealing surface that is configured to sealingly engage a circular surface surrounding the base wall opening. A circular surface may be cost-effective manufactured.

According to an embodiment, the pilot valve during operation of the fluid control valve is configured to be urged towards a closed state by means of a pressure difference between the main volume and control volume. The pressure within the fluid main volume is normally always higher than the pressure within the fluid control volume due to the pressure draining effect of the fluid drain outlet in combination with having the supply of high pressure fluid to the fluid main volume. Consequently, a surge force will be present at the opening in the base wall, which surge force urges the pilot valve towards a closed position. The surge force is generated due to a lower fluid pressure at the control volume side of a sealing flange of the pilot valve than at the main volume side of said sealing flange.

According to an embodiment, the pilot valve comprises an abutment surface configured to interact with an actuator piston of the electro-mechanical actuator, such that the actuator piston can open the pilot valve.

According to an embodiment, the pilot valve comprises a sealing flange and a removable fastener, such as a retaining ring, circlip or the like, and the pilot valve is secured within the base wall opening by means of the sealing flange positioned on the fluid main volume side of the base wall, and by means of the removable fastener positioned on the control volume side of the base wall. The pilot valve needs an arrangement for securing the pilot valve axially slidable within the opening in the base wall. The removable fastener is located on the control volume side of the base wall and arranged to protrude radially beyond the opening in the base wall, thereby forming a stopping member in the first axial direction, and the sealing flange is located on the main volume side of the base wall and protrudes radially beyond the opening in the base wall, thereby forming a stopping member in an axial direction opposite the first axial direction. Assembly of the pilot valve within the opening in the base wall may be performed by first inserting a part of the pilot valve including the sealing flange into the hole of the base wall from the main volume side, and subsequently securing the removable fastener, which may be composed of one, two or more components, to an axial extension of the first part of the pilot valve on the control volume side of the base wall.

According to an embodiment, the pilot valve is secured at the base wall opening by means of cage in which the pilot valve is located, and the cage is fixed with respect to the base wall. The alternative design solution of the pilot valve may omit the removable fastener on the control volume side of the base wall because the pilot valve is secured to the hole in the base wall by the cage instead. The cage, which preferably is installed after the pilot valve was installed in the opening in the base wall, prevents the pilot valve from falling out of the opening in the base wall.

According to an embodiment, the cage comprises a filter for preventing contamination particles within the fluid from entering the control volume. The fluid may contain particles released due to wear of the components in contact with the fluid. These contamination particles may cause malfunction of the fluid control valve, or other parts of the fluid system, and it is desirable to catch and remove these particles from the fluid flow. This can be realised by providing the cage with a filter, such that the fluid entering the fluid control volume is filtered from particles.

According to an embodiment, the pilot valve is preloaded towards a closed position by means of a pilot valve spring member. In case the above-mentioned surge force is considered insufficient or is not available for some reason, the pilot valve may be preloaded towards a closed position by a spring member instead, or in combination with the surge effect.

According to an embodiment, the fluid drain outlet is configured to be connected to a fluid pipe or fluid reservoir that is configured to exhibit a lower fluid pressure than the fluid pressure at a control valve inlet during operation of the fluid control valve, such that the fluid pressure in the control volume is lower than the fluid pressure in the main volume. A lower pressure in the main volume enables motion of the main valve in the direction of the control volume.

According to an embodiment, the control valve comprises a non-variable flow restriction within a fluid drain passage. The fluid drain passage refers to the passage starting at the cylindrical housing and ending at said fluid pipe or fluid reservoir. The flow restriction is preferably provided at the fluid control valve, and may be formed as a throttle. A non-variable flow restriction provides a robust and cost-effective solution.

According to an embodiment, the cylindrical main valve and the cylindrical housing define a piston-cylinder relationship. The term piston-cylinder relationship refers to a relationship with a relatively low leakage and tight tolerances between the parts.

According to an embodiment, the cylindrical main valve comprises a cylindrical sleeve axially movably arranged inside the housing. The cylindrical sleeve ensures coaxial orientation of the main valve and housing.

According to an embodiment, the base wall has a disk-shape and is located within and is attached to the sleeve.

According to an embodiment, the main extension of the base wall defines a plane that is perpendicular an axial direction of the cylindrical housing.

According to an embodiment, the base wall opening is a centrally arranged circular through hole.

According to an embodiment, the electro-mechanical actuator is a linear actuator.

According to an embodiment, the electro-mechanical actuator comprising an actuator piston configured to act on the pilot valve, wherein the actuator piston extends through the fluid control volume.

According to an embodiment, the actuator piston is spring loaded towards a retracted state by means of a spring member. Thereby the actuator may be a single acting actuator, i.e. acting only in one direction.

According to an embodiment, the spring member is provided between an abutment surface of the actuator piston and an opposing abutment surface of the housing.

According to an embodiment, the fluid control volume is delimited by the base wall on one axial side and at least partly by the electro-mechanical actuator on the other axial side. Thereby no passage for the piston through a wall of the housing is required.

According to an embodiment, the fluid control valve is configured for controlling flow of lubrication oil or cooling fluid in a combustion engine. These two fluids have some similarities in terms of requiring a heat exchanging system to dissipate heat from the fluid. The lubrication oil has a cooling fluid effect in a combustion engine, similar to a cooling fluid, such as water cooling fluid.

According to an embodiment, the fluid control valve comprising a fluid inlet, a first fluid outlet and a second fluid outlet, wherein the main valve is configured to control the flow of fluid from the fluid inlet to the first fluid outlet and second fluid outlet respectively as a function of the axial position of the main valve.

According to an embodiment, one of the fluid inlet and outlets are formed by at least a first opening through the cylindrical side wall of the cylindrical housing and another of the fluid inlet and outlets is formed by a second opening through the cylindrical side wall, wherein the first opening being axially displaced from the second opening.

According to an embodiment, the main valve comprising at least one opening through its cylindrical side wall and configured to match at least one of the first and second openings, preferably selectively both of first and second openings, of the housing for controlling the flow of fluid from the fluid inlet to the first fluid outlet and second fluid outlet respectively as a function of the axial position of the main valve.

According to an embodiment, an axial abutment surface of the main valve cooperates with an axial abutment surface of the housing for controlling the flow of fluid from the fluid inlet to the first fluid outlet and second fluid outlet respectively as a function of the axial position of the main valve.

According to an embodiment, a heat exchange system comprising a heat exchange fluid circuit having a heat source, a heat exchanger, a heat exchanger by-pass, a fluid pump and a fluid control valve, wherein the fluid control valve controls the ratio of flow through the heat exchanger and the heat exchanger bypass.

Further advantages and advantageous features of the invention are disclosed in the following description.

The term first axial direction refers to an axial direction of the cylindrical housing that extends from the control volume side of the fluid control valve towards the main volume side of the fluid control valve. This axial direction may alternatively be referred to as main volume direction or direction of the main volume.

The term axial direction opposite the first axial direction refers to an axial direction of the cylindrical housing that extends from the main volume side of the fluid control valve towards the control volume side of the fluid control valve. This axial direction may alternatively be referred to as second axial direction, control volume direction or direction of the control volume.

The term fluid control valve refers to a valve capable of controlling a flow of fluid through the valve.

The term opening through a housing wall refers to any type of opening, though-hole or aperture suitable for forming a flow path thought the opening in the house wall. The opening may enable flow through the opening in an axial direction or radial direction, depending on position of opening.

The cylindrical main valve, which is axially movably arranged inside the housing, is preferably provided with an outer diameter slightly smaller than the inner diameter of the cylindrical housing, such that a relatively low level of leakage is available between the housing and main valve.

The term main valve spring member includes all types of spring members that can exert an axial force, such as helical spring, coil spring, disc spring, compression spring, volute spring, wave spring.

The term base wall refers to wall that divides the cylindrical housing in two axially spaced apart regions. The base wall preferably extends in a plane perpendicular the axial direction of the housing.

The term opening in the base wall refers to any type of opening, though-hole or aperture suitable for forming a flow path thought the opening in the base wall. The opening typically enables flow through the opening in a direction substantially perpendicular to the extension of the base wall. The opening fluidly connects the fluid control volume with the fluid main volume when the pilot valve is in an open position.

The term pilot valve refers to a valve that indirectly controls the axial position of the main valve. The pilot valve has a smaller dimension that the main valve and is therefore more easily actuated that the main valve.

The term electro-mechanical actuator refers to all types of actuators that can mechanically control the position of the pilot valve using electrical energy. A linear electro-mechanical actuator cooperating with an axially displaceable pilot valve is a preferred design due to its relatively non-complexity and low-cost. The invention is however not limited to this design and many alternative designs are possible, such as angular actuators, turning actuators, etc. Furthermore, the actuator as such may be based on solenoid technology, screw thread, or any other technology for generating a mechanical actuation by electrical power.

BRIEF DESCRIPTION OF THE DRAWINGS

With reference to the appended drawings, below follows a more detailed description of embodiments of the invention cited as examples.

In the drawings:

FIG. 7 shows a schematic illustration of a first embodiment of the pilot valve according to the disclosure, FIG. 8 shows a second embodiment of the pilot valve according to the disclosure, FIG. 9 shows a third embodiment of the pilot valve according to the disclosure FIG. 10 shows a fluid control valve according to a second embodiment of the disclosure, FIG. 11 shows a fluid control valve according to a third embodiment of the disclosure in a first operating state, FIG. 12 shows a fluid control valve according to the third embodiment of the disclosure in a second operating state, and FIG. 13 shows a fluid control valve according to a fourth embodiment of the disclosure.

DETAILED DESCRIPTION

Embodiments of the fluid control valve, heat exchange system and method for adjusting the axial position of the main valve of the fluid control valve will now be described with reference to the accompanying figures, wherein like numerals refer to like or similar elements throughout. Although several embodiments, examples and illustrations are disclosed below, it will be understood by those of ordinary skill in the art that the inventions described herein extends beyond the specifically disclosed embodiments, examples and illustrations, and can include other uses of the inventions and obvious modifications and equivalents thereof. The terminology used in the description presented herein is not intended to be interpreted in any limited or restrictive manner simply because it is being used in conjunction with a detailed description of certain specific embodiments of the inventions. In addition, embodiments of the inventions can comprise several novel features and no single feature is solely responsible for its desirable attributes or is essential to practicing the inventions herein described.

The disclosure relates to a fluid control valve that may be used in any types of fluid system, preferably however in fluid-based heat exchange system, such as a fluid cooled power source for a vehicle.

Figure 1:
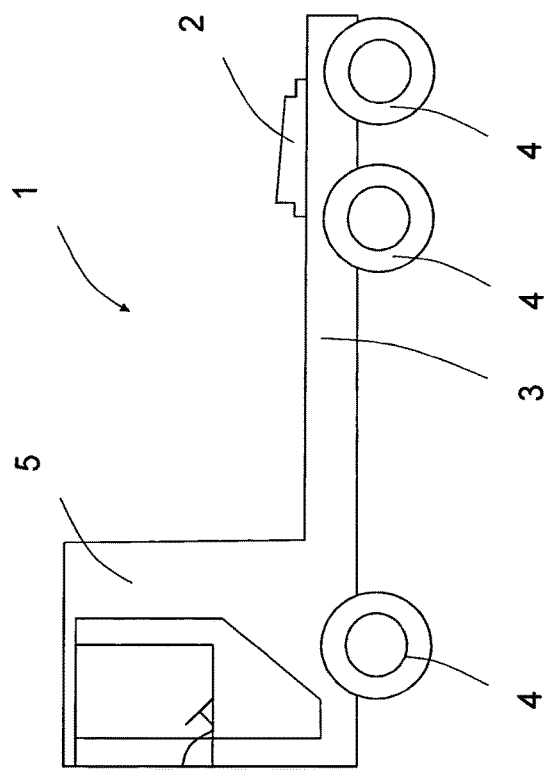
FIG. 1 shows a vehicle that typically may comprise an engine having a fluid control valve according to the disclosure.

FIG. 1 schematically shows a side-view of a truck 1 having a fluid cooled power source, in particular a diesel engine. The truck 1 is arranged for transporting heavy loads on roads, for example by being connected via a fifth wheel 2 to a load carrying trailer (not shown). A typical truck further comprises a frame 3, wheels 4 and a driver's cabin 5.

Figure 2:
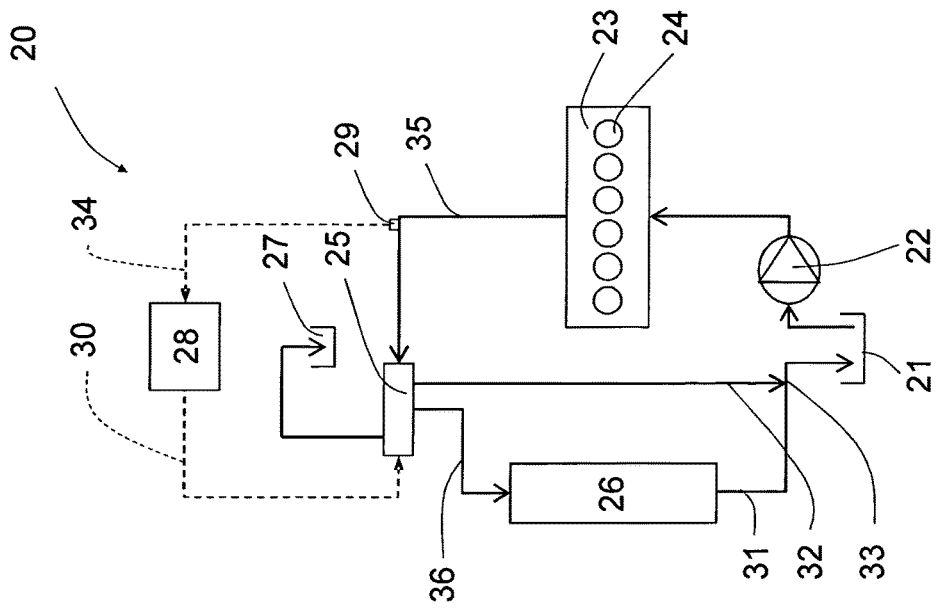
FIG. 2 shows an oil circuit of a combustion engine.

Next, a first embodiment of a system including the fluid control valve according to the disclosure is described in connection with FIG. 2. The fluid control valve according to this particular embodiment is installed in an oil circuit 20.

The oil circuit 21 comprises a fluid reservoir 21, an oil pump 22, a heat source embodied as a combustion engine 23 having a plurality of reciprocating pistons 24 arranged in individual cylinders, a fluid control valve 25 and a heat exchanger 26 for moving heat from the working fluid to the surroundings, such as the surrounding air.

In combustion engines 23 having reciprocating pistons 24 the motor oil lubricates rotating and/or sliding surfaces between crankshaft journal bearings and rods connecting the pistons 24 to the crankshaft. The oil typically is collect in a reservoir 21, such as an oil pan or sump, at the bottom of the crankcase. The oil pump 22 takes oil from the reservoir 21 and sends it through oil filter (not shown) into oil galleries of the engine block, and further to the main bearings holding the crankshaft up at the main journals and camshaft bearings operating the valves. The reservoir 21 may be depicted as being located outside of the engine 23 in FIG. 2 but figure merely schematically illustrates the oil circuit 20. The oil reservoir 21 may be located integrated within the engine 23 or outside of the engine 23.

The oil circuit 20 not only serves for lubrication of the moving parts of the engine but also for enabling cooling of the motor. The lubrication performance of the motor oil is dependent on the temperature of the oil and lubrication performance of the oil generally degrades with excessive oil temperature. There is thus a need to enabling removal of heat from the motor oil. This is realised by the heat exchanger 26, which operates to dissipate heat from the oil and transferring heat from the oil to the surrounding air.

However, the need for cooling of the oil varies over time and there is a need for a variable cooling effect. This is realised by providing an oil by-pass line 32 that enables oil circulating in the oil circuit 20 to circumvent the heat exchanger 26, thereby avoiding the potential cooling effect may be provided by the heat exchanger 26.

A fluid control valve 25 is provided at a first branching point where the by-pass line 32 connects with a heat exchanger line 31 upstream of the heat exchanger 26. The fluid control valve 25 controls the ratio of flow in respective branch line 31, 32, i.e. the level of oil flowing through the by-pass line 32 and the heat exchanger line 31 respectively.

Normally, the fluid control valve 25 does not control the flow volume over time through the fluid control valve 25 but merely the path of the fluid flow. It thus only controls the direction of the flow. For this purpose it comprises one fluid inlet and two fluid outlets, wherein the fluid inlet is fluidly connected to the engine 23, a first fluid outlet is connected to the heat exchanger and a second fluid outlet is connected to the by-pass line 32, and wherein the fluid control valve controls the ratio fluid inlet flow—first fluid outlet flow, as well as fluid inlet flow—second fluid outlet flow. The by-pass line 32 reconnects with the heat exchanger line 31 downstream the heat exchanger 26 at a second branch point 33, which is fluidly connected to the fluid reservoir 21.

The fluid control valve 25 is also connected to a low pressure fluid reservoir 27, which may be an individual reservoir or the same reservoir 21 as previously described.

The oil circuit 20 further comprises an electronic control unit 28 that is arranged to electronically control the flow route through the fluid control valve. The electronic control unit 28 is connected to the fluid control valve by means of a communication line 30 and arranged to control the fluid control valve as a function of at least the temperature indicative of the of the oil temperature within the oil circuit.

The temperature indicative of said oil temperature is for example the oil temperature of the oil exiting the engine, the oil temperature of the oil entering the engine, the temperature of the engine block, for the like. The electronic control unit 28 may be connected to a heat sensor 29 by means of a further communication line 34. The communication lines 30, 34 may be electrical or optical signal cables, bus communication system, or the like.

Figure 3:
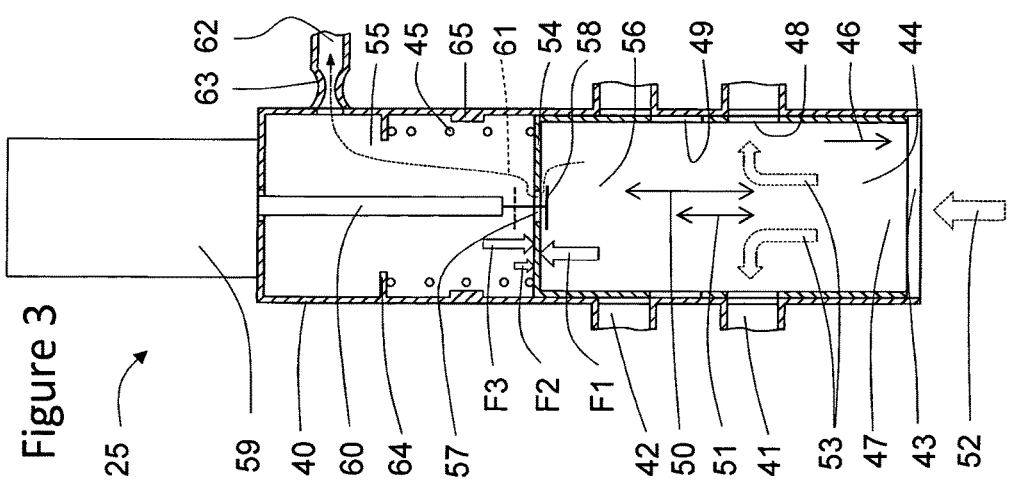
FIG. 3 shows a fluid control valve according to a first embodiment of the disclosure in a first operating state.

FIG. 3 shows a first embodiment of the fluid control valve 25 of the disclosure. The fluid control valve 25 comprises a cylindrical housing 40 with a first pair of openings 41 through the housing wall at a first axial location along the cylindrical housing 40, and a second pair of openings 42 through the housing wall at a second axial location along the cylindrical housing 40. The first pair of openings 41 which define a first fluid outlet are axially displaced from the second pair 42 of openings which define a second fluid outlet.

The shown fluid control valve comprises two oppositely located first openings 41, and two oppositely located second openings 42, but the number, shape, form and dimension of the openings 41, 42 may be adjusted according to the circumstances, such as a single first and second opening or more than two first and second openings.

Moreover, the first and second pair of openings 41, 42 constitute according to the shown embodiment first and second fluid outlets respectively, and an axial opening 43 in the cylindrical housing constitute according to the shown embodiment a housing fluid inlet.

The housing fluid inlet may for example be connected to a fluid line 35 conveying oil away from the engine 23 towards the heat exchanger 26 and by-pass line 32. The first fluid outlet may for example be connected to the by-pass line 32, and the second fluid outlet may for example be connected to the heat exchanger line 36.

The fluid control valve 25 further comprises a cylindrical main valve 44 axially movably arranged inside the housing 40 for controlling a fluid flow through the first and second openings 41, 42. The cylindrical main valve comprises a cylindrical sleeve, which together with the cylindrical housing defines a piston-cylinder relationship, i.e. the main valve is slidably arranged within the housing with a relatively tight clearance, such that the level of leakage between the main valve and housing is small.

A main valve spring member 45 contact the main valve 44 and urges the main valve 44 in a first axial direction 46.

Also the main valve comprises first pair of openings 48 and second pair of opening 49 through its cylindrical side wall. The first and second pair of openings 48, 49 of the main valve are configured to selectively match the first and second pair of openings 41, 42 of the housing, respectively, depending in the axial position of the main valve 44 within the housing 40, for controlling the flow of fluid from the housing fluid inlet to the first fluid outlet and second fluid outlet, respectively as a function of the axial position of the main valve. This functionality is rendered possible having a first axial offset 50 between the first and second pair of openings 41, 42 of the housing and a second axial offset 51 between the first and second pair of openings 48, 49 of the main valve, wherein the first and second axial offsets 51, 52 are different. In the shown embodiment, the first axial offset 50 is larger than the second axial offset 51. Thereby, a first flow passage through the first pair of openings 41, 48 of the main valve and housing will form in a first axial position of the main valve 44, and a second flow passage through the second pair of openings 42, 49 of the main valve and housing will form in a second axial position of the main valve 44.

The second flow passage is preferably completely closed when the first flow passage in completely open, and the first flow passage is preferably completely closed when the second flow passage in completely open.

When the main valve is located in the region between these end positions, a variable ratio of flow in the first and second flow passage may preferably be provided, depending on the axial position of the main valve relative to the housing. Thereby a split flow of variable level can be selected, such as for example 100/0, 75/25, 50/50, 25/75 and 0/100, where the relations define the ratio of flow through the first and second flow passage respectively. In FIG. 3, the main valve is located in an axial position where the first flow passage is completely open and the second flow passage is completely closed, as depicted by the inlet flow arrow 52 and outlet flow arrows 53.

The main valve 44 further comprises a base wall 54 defining a fluid control volume 55 and fluid main volume 56 in the cylindrical housing 40. The base wall 54 comprises an opening 57 for fluidly connecting the fluid control volume 55 with the fluid main volume 56.

A pilot valve 58 is positioned at the base wall opening 57. The pilot valve 58 is moveably arranged in the axial direction for controlling a fluid flow through the base wall opening 57.

The fluid control valve 25 further comprises an electro-mechanical actuator 59 having an actuator piston 60, which is configured to act on the pilot valve 58 for controlling the position of the pilot valve 58, for the purpose of indirectly controlling the axial position of main valve 44. This is possible because the main valve 44 is configured to be axially free floating within the housing 40. This means that no actuator contacts or is directly connected to the main valve 44. Instead, the axial position of the main valve 44 is determined by a force equilibrium position resulting from the accumulated axial forces acting on the main valve 44.

The main axial forces acting on the main valve 44 in the first axial direction 46 during operation of the fluid control valve 25 comprises the axial force F2 provided by the main valve spring member 45 and an axial force F3 generated by the fluid pressure in the control volume 55. The main axial force acting on the main valve 44 in a direction opposite the first axial direction 46 is the axial force F1 generated by the fluid pressure in the main volume 56.

The term "main axial forces" herein refers to the axial force or forces acting on the main valve in any single axial direction and which constitute at least 75% of the total axial forces acting on the main valve 44 in said axial direction, specifically at least 85% of the total axial forces, and more specifically at least 95% of the total axial forces. The gravity force, friction force, etc. acting on the main valve 44 are considered small in relationship with the previously defined forces F1-F3 and are therefore ignored.

The axial force F2 provided by the main valve spring member 45 depends on the spring constant and the level of compression. The axial force F1 generated by the fluid pressure in the main volume 56 depends mainly on the pump feed pressure. The axial force F3 generated by the fluid pressure in the control volume 55 depends on the fluid pressure in the main volume 56, the degree of opening of the pilot valve 58 and a drain outlet flow 61 from the control volume 55 via a fluid drain outlet 62 of the cylindrical housing 40. The sum of these forces controls the position of the main valve 44.

By moving the pilot valve 58 towards a more open position using the actuator piston 60 of the electro-mechanical actuator 59 a pressure equalization occurs between the main volume 56 and control volume 55 simply due to an increased flow of high pressure fluid from the main volume 56 to the control volume 55 past the pilot valve 58. As pressure within the control volume 55 increases the main valve 44 starts to move in the first axial direction 46 due to increased axial force F3 generated by the fluid pressure in the control volume 55 but constant axial force F1 generated by the fluid pressure in the main volume 56.

For the purpose of enabling motion of the main valve 44 in the direction opposite the first axial direction 46, it must be possible to reduce the pressure within the control volume 55 again. This is realised by the drain outlet 62. The fluid drain outlet 62 is configured to be connected to a fluid pipe or low pressure fluid reservoir 27 that is configured to exhibit a lower fluid pressure than the fluid pressure at the fluid control valve inlet during operation of the fluid control valve 25, such that the fluid pressure in the control volume 55 can be set lower than the fluid pressure in the main volume 56 simply be draining fluid from the control volume 55.

If the fluid drain outlet 62 would be connected to fluid reservoir having too high pressure, it would not be possible to drain the control volume 55 and the main valve 44 could then not be displaced towards the direction opposite the first axial direction 46. However, in order to enable in relatively high pressure within the control volume 55 the drain flow must be not be allowed to be too high. This is cost-effectively solved by providing the fluid control valve 25 with a non-variable flow restriction 63 within a fluid drain passage.

The flow restriction 63 is preferably integrated into the fluid drain outlet 62 of the fluid control valve 25, but the flow restriction 63 may alternatively be positioned anywhere along the fluid drain passage. A controlled, variable flow restriction 63 may be provided as an alternative to the non-variable flow restriction 63 in case further control parameters are desired.

In addition to what has already been disclosed, the housing 40 may comprise a first annular abutment 64 for acting as support structure for the main valve spring member 45. Furthermore, the housing may also comprise a second annular abutment 65 acting as end stop for the main valve 44 in the direction opposite the first axial direction 46.

The functionality of the fluid control valve 5 will now be disclosed in connection with FIGS. 3-7. In FIG. 3, which shows a steady-state operating position of the fluid control valve 25, the actuating piston 60 is in contact with the pilot valve 58. The main valve 44 has adopted an axial position according to a current force equilibrium, i.e. an axial position in which the accumulated axial forces acting on the main valve 44 are nil. A constant drain flow 61 flows from the main volume 56, through the opening 57 in the base wall 54 and into the control volume 55. The same drain flow 61 also flows from the control volume 55 out through the drain outlet 62. The first flow passage is open and the second flow passage is closed. The axial position of the main valve 44 is self-controlled, and only indirectly controlled by the actuating piston 60.

The flow distribution illustrated in FIG. 3 which may indicate 100% flow through the by-pass line. Such flow distribution is typically used during engine start up when the oil is still cold and needs to be quickly heated to reach an optimal working temperature.

After a certain time period, when the oil is beginning to approach a target temperature, the electronic control unit 28, which receives information about oil temperature from the heat sensor 29, controls the fluid control valve 25 using a regulator function to slowly adjust the flow distribution, such that a certain level of hot oil is distributed to the heat exchanger 26, in an effort of keeping the oil temperature as close as possible to a predetermined target temperature.

Figure 4:
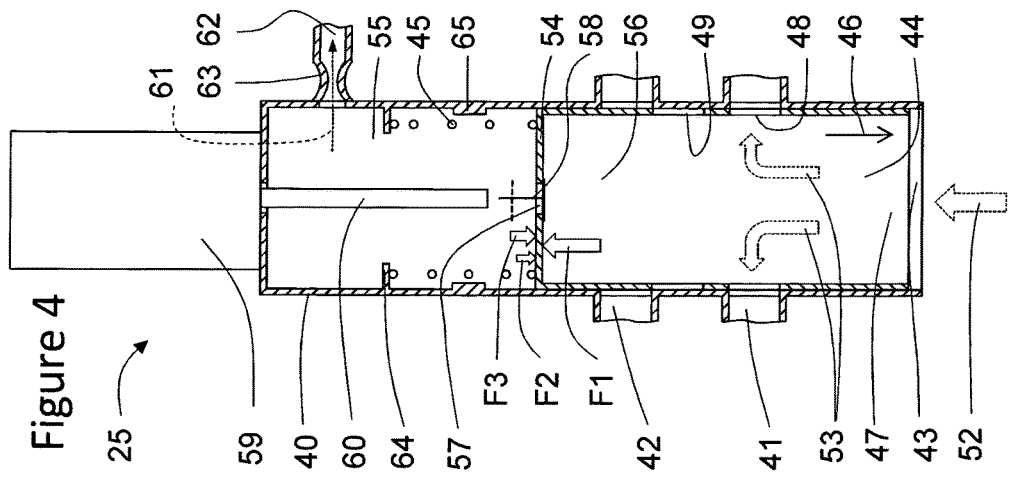
FIG. 4 shows a fluid control valve according to a first embodiment of the disclosure in a second operating state.

The control signal controlling the flow distribution within the flow control valve 25 normally varies relatively slowly over time, but for the purpose of better showing the functionality of the fluid control valve 25 the operating condition just after a very large sudden retraction of the actuator piston 60 is illustrated in FIG. 4. The main valve 44 has not yet changed position but the pilot valve 58 has moved to a closed position due to the lack of force from the actuating piston 60 keeping the pilot valve 58 open. The force acting on the pilot valve 58 is the surge force generated by the higher static fluid pressure within the main volume 56 compared with the lower dynamic fluid pressure within the opening 57 of the base wall 54. Moreover, as soon as the pilot valve 58 is closed, it remains in the closed position due to a higher fluid pressure within the main volume 56 than the control volume 55.

The pressure within the control volume 55 will now begin to decrease due to the drain flow 61 out of the control volume 55 while the entry of new high pressure oil past the pilot valve 58 is stopped. Consequently, the axial force F3 generated by the fluid pressure in the control volume 55 will decrease and thereby change the pressure equilibrium of the main valve 44. As soon as the axial force F1 generated by the fluid pressure in the main volume 56 is larger than the combined axial force F2, F3 provided by the main valve spring member 45 and the fluid pressure in the control volume 55, respectively, the main valve 44 will start to move in the direction opposite the first axial direction 46.

Figure 5:
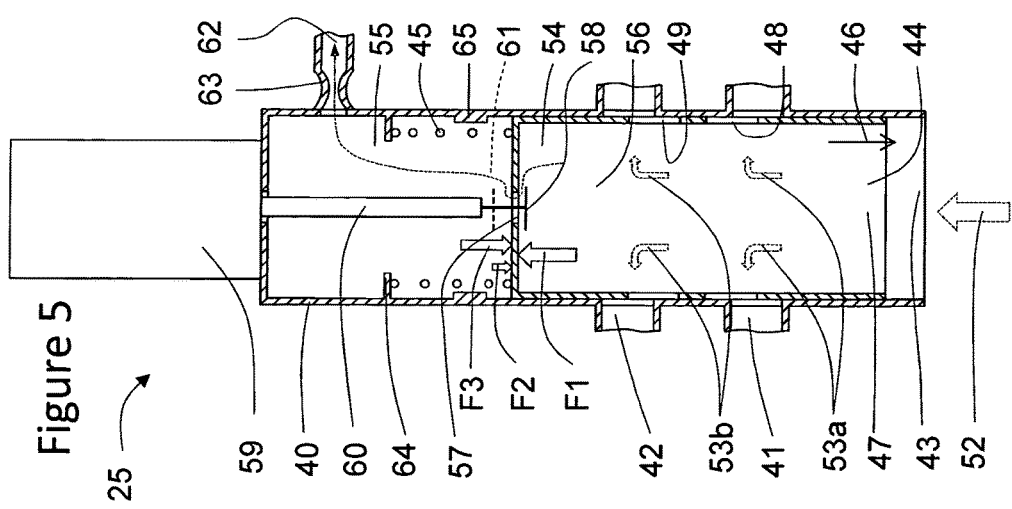
FIG. 5 shows a fluid control valve according to a first embodiment of the disclosure in a third operating state.

FIG. 5 illustrates the new steady-state position of the fluid control valve, where the flow distribution has changes from 100% via the first flow passage to about 50/50 between the first and second flow passages. The new force equilibrium of FIG. 5 corresponds to that of FIG. 3.

Figure 6:
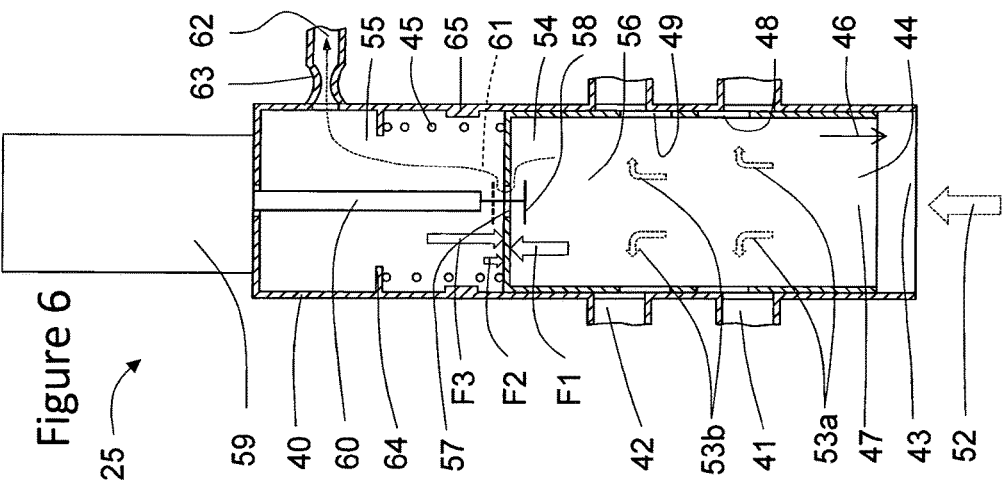
FIG. 6 shows a fluid control valve according to a first embodiment of the disclosure in a fourth operating state.

Again, for the purpose of better showing the functionality of the fluid control valve 25, the operating condition just after a very large sudden extension of the actuator piston 60 is illustrated in FIG. 6. The main valve 44 has not yet changed position but the pilot valve 58 has moved towards a more open position due to actuating force provided by the actuating piston 60, which has pushed the pilot valve 58 in the first axial direction 46. The pressure within the control volume 55 will now begin to increase due to a relatively constant drain flow 61 out of the control volume but with a much higher inflow of new high pressure oil past the pilot valve 58. Consequently, the axial force F3 generated by the fluid pressure in the control volume 55 will increase and thereby change the pressure equilibrium of the main valve 44 again.

As soon as the axial force F1 generated by the fluid pressure in the main volume 56 is lower than the combined axial force F2, F3 provided by the main valve spring member 45 and the fluid pressure in the control volume 55, respectively, the main valve 44 will start to move in the first axial direction 46, thereby changing the flow distribution within the fluid control valve 25 towards the flow distribution situation shown in FIG. 3.

The pilot valve 58 is secured to the opening 57 in the base wall 54, and arranged to control flow through the opening 57. This is realised by either closing the opening 57 for preventing flow there through, or opening the opening 57 for enabling flow there through.

The pilot valve 58 may have many different designs and a first example embodiment is schematically shown more in detail in FIG. 7. In a closed state a circular sealing surface 70 of the pilot valve 58 contacts and sealingly engages a circular surface 71 surrounding the base wall opening 57. A sealing flange 72 of the pilot valve 58 consequently comprises a larger extension in a radial direction 73 than the base wall opening 57.

The main extension of the base wall defines a plane that is perpendicular to an axial direction of the cylindrical housing 40. The base wall opening 57 is a centrally arranged circular through hole.

The pilot valve 58 further comprises a stopping member 74 located axially offset from the sealing flange 72. The stopping member 74 is configured to secure the pilot valve 58 to the base wall opening 57, thereby preventing that the pilot valve 58 from becoming dislocated from the base wall opening 57.

In the embodiment of FIG. 7 the stopping member 74 and the sealing flange 72 are located on opposite sides of the base wall 54. The sealing flange 72 is positioned on the fluid main volume side of the base wall, and the stopping member 74 is positioned on the control volume side of the base wall 54.

An axial connection member 75 may be provided to connect the sealing flange 72 with the stopping member 74. The axial connection member 75 is preferably integrally formed with the sealing flange 72 or stopping member 74. One of the sealing member 72 and stopping member 74 is preferably removably attached to the remaining part of the pilot valve 58 for simplifying assembly of the pilot valve 58 into the base wall opening 57. The stopping member 74 may for example be removable fastener that is attached to the axial connection member 74, such as a retaining ring, circlip or the like.

The stopping member 74 should be arranged to enable flow through the base wall opening 57 when the stopping member 74 contacts the base wall 54. One solution is to provide the stopping member 74 with one or more axial through holes or a perforation.

The pilot valve 58 further comprises an abutment surface 76 configured to interact with the actuator piston 60 of the electro-mechanical actuator 59, such that the actuator piston 60 can open the pilot valve 58. In the embodiment of FIG. 7 the abutment surface 76 is provided in a portion of the pilot valve 58 that projects in the axial direction from the stopping member 74. However, the stopping member 74 itself, or the connection member 75, may comprise the abutment surface 76.

A more detailed illustration of an example embodiment of the pilot valve 58 is shown in FIG. 8. A disc shaped sealing flange 72 is connected with an axial connection member 75 in form of a tubular connection member. The sealing flange 72 is arranged to sealingly engage the sealing surface 71 of the base wall 54. The connection member 75 is arranged within the base wall opening and provided with an outer diameter that is slightly smaller than the inner diameter of the base wall opening 57, such that the connection member 75 provide a guidance to the pilot valve 58 for ensuring that the pilot valve 58 maintains a proper coaxial arrangement with the base wall opening 57. The connection member 75 is provided with radially extending through holes 77 for enabling fluid to enter the volume within the connection member 75.

A stopping member 74 in form of a disc is secured to the connection member 75 in the other side of the base wall 54, wherein the stopping member 74 extends beyond the opening 57 in a radial direction 73 (perpendicular to the axial direction). The stopping member 74 is provided with a central opening 78 for enabling flow of fluid through the pilot valve 58, from the main volume 56 to the control volume 55.

A projecting member having an abutment surface 76 is additionally provided on the stopping member 74 for interaction with the actuating piston 60.

Yet another embodiment of the pilot valve 58 is shown in FIG. 9. Similar to the embodiment of FIG. 8, the pilot valve 58 comprises a disc shaped sealing flange 72 that 5 is connected with a tubular shaped axial connection member 75. The sealing flange 72 is arranged to sealingly engage a sealing surface 71 of the base wall 54. The axial connection member 75 is arranged within the base wall opening 57 and dimensioned such that the connection member 75 provides guidance for the pilot valve 58 for ensuring that the pilot valve 58 maintains a proper coaxial arrangement with the base wall opening 10 57. The tubular-shaped connection member 75 is provided with radially extending through-holes 77 for enabling fluid to enter the volume within the axial connection member 75.

The pilot valve 58 according to this embodiment does not comprise any stopping member. Instead, a cage 79 fastened to the main volume side of the base wall 54 is 15 provided. The cage 79 is arranged to secure the pilot valve 58 to the base wall opening 57 while still enabling a certain axial motion of the sealing flange 72 for opening and closing the flow path through the base wall opening 57.

The cage 79 is designed to enable a certain level of opening of the sealing flange 72, but to restrict further opening beyond a certain level. An axial stopping portion 80 of 20 the cage 79 is located at a distance from the base wall 54 that is smaller than the axial length of the pilot valve 58 for ensuring that the pilot valve 58 cannot fill-out from the base wall opening 57.

The stopping portion 80 is secured to the base wall 54 by means of a tubular member 81 having radial through holes for enabling flow from the main volume 56 to the 25 control volume 55.

The cage 79 preferably further comprises a filter 82 for preventing contamination particles within the fluid from entering the control volume 55. The filter 82 may be secured to the cage 79 by locating the filter 82 between two tubular members 81 having radial through holes. The pilot valve 58 is preferably free floating within the base wall opening 30 57, but the pilot valve 58 may alternatively be preloaded towards a closed position by means of a pilot valve spring member (not shown).

The electro-mechanical actuator 59 schematically shown in FIGS. 3-6 is a linear actuator, i.e. an actuator having an actuator piston 60 moving merely in a linear direction. The actuator 59 is preferably of the solenoid-type, i.e. of a type where the actuator piston 35 60 is controlled by means of a magnetic field generated by an electrical current flowing through a coil. However, other actuator designs are possible, such as screw-threaded piston design, fluid powered piston design, etc.

The electro-mechanical actuator 59 is located on a side of the control volume 55 that is located opposite the base wall 54. The fluid control volume 55 is consequently delimited by the base wall 54 on one axial side and at least partly by the electromechanical actuator 59 on the other axial side. As a result, the actuator piston 60 extends through the fluid control volume 55.

The actuator piston 60 may, depending on the used actuating design and technology, only generate an actuating force in one linear direction. As a result, the actuator piston 60 may require assistance for its motion in the other direction. FIG. 10 illustrates a fluid control valve 25 comprising an actuator piston 60 that is spring loaded towards a retracted state by means of a spring member 90. The spring member 90 is located between the first annular abutment 64 of the housing and an annular abutment 91 provided on the actuator piston 60.

The design of the fluid control valve 25 may vary from the design shown in FIGS. 3-6. One alternative design having many similarities to the design of FIGS. 3-6 is shown in FIGS. 11 and 12. A cylindrical main valve 44 is axially slidably arranged within a cylindrical housing 40 that comprise first and second openings 41, 42 in the side wall of the housing 40, as well as an axial opening 43.

The flow distribution through the fluid control valve 25 is controlled by the axial position of the main valve 44, which axial position is indirectly controlled the electromechanical actuator 59 via the pilot valve 58.

Contrary to the design of the embodiment of FIGS. 3-6, the main valve 44 does not comprise any through holes in the cylindrical side wall forming first and second flow holes. Instead, an axial abutment surface 93 of the main valve 44 is arranged to cooperate with an axial abutment surface 92 of the housing 40 for controlling the flow of fluid from the fluid inlet to the first fluid outlet and second fluid outlet respectively as a function of the axial position of the main valve 44. Both the axial abutment surface 93 of the main valve 44 and the axial abutment surface 92 of the housing 40 thus form sealing surfaces of the fluid control valve 25.

In the embodiment of FIGS. 11 and 12 the axial opening 43 constitutes the fluid inlet, and the first and second openings 41, 42 constitute first and second outlets respectively.

FIG. 11 shows the main valve 44 in a closed position. The actuating piston 60 is extended to an extent to ensure that a relatively high level of fluid flow is present at the pilot valve 58. As a result, the pressure within the control volume 55 attains a level not far from the pressure level of the main volume 56, wherein the pressure levels differs mainly due to the constant drain flow 61 out through the drain outlet 62. The force of the main valve spring member 45 is however sufficient to overcome the opening force generated by the said pressure difference, such that the main valve 44 moves to the closed position, in which the axial abutment surface 93 of the main valve abuts and seals against the axial abutment surface 92 of the housing 40. As a result, the entire inlet flow exits via the first outlet as illustrated by arrow 53. The first outlet may for example be connected to the bypass line 32.

FIG. 12 shows another extreme position. Here, the actuator piston 60 is retracted to an extent to certainly provide a completely closed pilot valve 58. This is possible due to the annular internal abutment 65 of the housing 40 that limits the axial motion of the main valve 44 in the direction opposite the first direction 46. A completely closed pilot valve 58 results in a relatively low pressure within the control volume 55 due to the lack of incoming new high pressure fluid while maintained drain flow 61 through the drain outlet 62. As a result, the pressure within the control volume 55 decreases to an extent where the combined axial force of the pressure within the control volume 55 and main valve spring member 45 can no longer keep the main valve 44 in an open state, such that the main valve 44 slowly moves to the opened state. In the opened state the main valve 44 enables flow past the axial abutment surface 92 of the housing 40. As a result, the inlet flow exits via both the first and second openings 41, 42 with a certain internal distribution, such as about 50/50 for example. The second opening 42 may for example be connected to the heat exchanger line 36.

In the embodiment of FIGS. 11 and 12 it is not possible to control the fluid distribution such that 100% outlet flow is directed towards the second outlet because the lack of possibility of closing the first outlet. This could however easily be accomplished simply by providing a cylindrical sleeve portion 95 extending in the axial direction from the base wall 54 of main valve 44.

The cylindrical sleeve portion 95 should be fastened or integrally formed with the main valve 44 and axially slidable within the cylindrical housing 40 together with the main valve 44. The sleeve portion 95 should have an axial opening 47 for enabling fluid supplied to the fluid control valve 25 to enter the valve and into the cavity defined by the sleeve portion 95. The sleeve portion 95 should also be provided with an opening 48 in the cylindrical side wall thereof for enabling fluid having entered the fluid control valve 25 to exit the valve via the first and/or second fluid outlets with a variable flow distribution.

Contrary to the design solution of the FIGS. 11 and 12, the design solution of FIG. 13 enables a complete closure of the first fluid outlet, i.e. first opening 41, as shown in FIG. 13. Thereby, 100% outlet flow will exit via the second fluid outlet. The closure of the first outlet is realised by locating a side wall of the sleeve portion 95 over the first opening 41. Outlet flow via the second fluid outlet is enabled by means of the opening 48 in the side wall in the sleeve portion 95. When the main valve 44 and sleeve portion 95 moves in the first axial direction 46 starting from the position shown in FIG. 13, the flow blocking side wall of the sleeve portion 95 will move away from the first opening 41 for opening of the first fluid outlet, thereby enabling split flow distribution between the first and second fluid outlet with a variable flow distribution between 100/0-0/100.

It is to be understood that the present invention is not limited to the embodiments described above and illustrated in the drawings; rather, the skilled person will recognize that many changes and modifications may be made within the scope of the appended claims.

The fluid control valve 25 has been shown in connection with an oil circuit 20 of a combustion engine 23, but the fluid control valve 25 according to the disclosure can be used and implemented in many other applications. For example, the fluid control valve may used in an engine cooling circuit having for example water as cooling media. Such an installation have many common features with the embodiment of FIG. 2, such as a heat source, heat exchanger, heat exchanger by-pass line and fluid control valve for controlling the ratio of flow the heat exchanger and by-pass line respectively. The differences being mainly that the fluid pump may have a lower output pressure since there is no need for high pressure water cooling fluid, the use a cooling fluid expansion reservoir located externally from the engine block instead of engine block integrated fluid reservoir, and the lack of direct connection between a fluid pump inlet and reservoir as shown in FIG. 2.

The power source has here been illustrated as a piston engine but the fluid control valve is equally applicable for flow control in other types of combustion engines. Moreover, the fluid control valve may advantageously be implemented in any kind of heat exchanger circuit having a heat source, a heat exchanger and a heat exchanger by-pass line. The heat source may for example be hydraulic equipment for a hydraulically operated function of a working vehicle, truck or bus, or an electrical equipment such as an electrical machine or an electrical storage system.

The invention claimed is:

1. A fluid control valve comprising:
    a cylindrical housing with at least one opening through a housing wall;
    a cylindrical main valve axially movably arranged inside the housing for controlling a fluid flow through the at least one opening;
    a main valve spring member acting on the main valve, wherein the main valve comprises a base wall defining a fluid control volume and fluid main volume in the cylindrical housing, the base wall comprising an opening for fluidly connecting the fluid control volume with the fluid main volume;
    a pilot valve positioned at the base wall opening, which pilot valve is moveably arranged for controlling a fluid flow through the base wall opening; and
    an electro-mechanical actuator configured to act on the pilot valve for controlling the main valve via the pilot valve,
    wherein the fluid control valve is configured so that a first axial force acting on the main valve in a first axial direction during operation of the fluid control valve comprises an axial force provided by the main valve spring member and an axial force generated by fluid pressure in the control volume, and the fluid control valve is configured so that a second axial force acting on the main valve in a direction opposite the first axial direction is an axial force generated by fluid pressure in the main volume, and
    wherein the fluid control valve comprises a fluid inlet, a first fluid outlet and a second fluid outlet, wherein the main valve is configured to control a flow of fluid from the fluid inlet to the first fluid outlet and second fluid outlet respectively as a function of an axial position of the main valve, wherein the first fluid outlet is formed by a first opening of the at least one opening through the cylindrical side wall of the cylindrical housing and the second fluid outlet is formed by a second opening of the at least one opening through the cylindrical side wall, wherein the first opening is axially displaced from the second opening.

2. The fluid control valve according to claim 1, wherein the cylindrical housing comprises a fluid drain outlet for draining fluid from the control volume.

3. The fluid control valve according to claim 1, wherein the main valve spring member is configured to urge the main valve in a first axial direction away from the fluid control volume.

4. The fluid control valve according to claim 1, wherein the pilot valve is moveably arranged for controlling a fluid flow through the base wall opening from the fluid main volume to the fluid control volume.

5. The fluid control valve according to claim 1, wherein the electro-mechanical actuator comprises an actuator piston configured such that an axial position of the actuator piston indirectly controls the axial position of the main valve.

6. The fluid control valve according to claim 1, wherein the main valve is configured to be axially free floating, wherein the axial position of the main valve is determined by a force equilibrium position resulting from the accumulated axial forces acting on the main valve.

7. The fluid control valve according to claim 1, wherein the fluid control valve is configured so that the main axial force or forces acting on the main valve in any single axial direction constitute at least 75% of the total axial forces acting on the main valve in the axial direction.

8. The fluid control valve according to claim 1, wherein the pilot valve comprises a circular sealing surface that is configured to sealingly engage a circular surface surrounding the base wall opening.

9. The fluid control valve according to claim 1, wherein the pilot valve during operation of the fluid control valve is configured to be urged towards a closed state by means of a fluid pressure difference between the main volume and control volume.

10. The fluid control valve according to claim 1, wherein the pilot valve comprises an abutment surface configured to interact with an actuator piston of the electro-mechanical actuator, such that the actuator piston can open the pilot valve.

11. The fluid control valve according to claim 1, wherein the pilot valve comprises a sealing flange and a removable stopping member, and the pilot valve is secured within the base wall opening by means of the sealing flange being positioned on the fluid main volume side of the base wall, and the removable stopping member being positioned on the control volume side of the base wall.

12. The fluid control valve according to claim 1, wherein the pilot valve is secured at the base wall opening by means of cage in which the pilot valve is located, and the cage is fixed with respect to the base wall.

13. The fluid control valve according to claim 12, wherein the cage comprises a filter for preventing contamination particles within the fluid from entering the control volume.

14. The fluid control valve according to claim 1, wherein the pilot valve is preloaded towards a closed position by means of a pilot valve spring member.

15. The fluid control valve according to claim 2, wherein the fluid drain outlet is configured to be connected to a fluid pipe or fluid reservoir that is configured to exhibit a lower fluid pressure than the fluid pressure at a control valve inlet during operation of the fluid control valve, such that the fluid pressure in the control volume is lower than the fluid pressure in the main volume.

16. The fluid control valve according to claim 1, wherein the fluid control valve comprises a non-variable flow restriction within a fluid drain passage.

17. The fluid control valve according to claim 1, wherein the cylindrical main valve and the cylindrical housing define a piston-cylinder relationship.

18. The fluid control valve according to claim 1, wherein 35 the cylindrical main valve comprises a cylindrical sleeve axially movably arranged inside the housing.

19. The fluid control valve according to claim 18, wherein the base wall has a disk-shape and is located within and is attached to the sleeve.

20. The fluid control valve according to claim 1, wherein a main extension of the base wall defines a plane that is perpendicular an axial direction of the cylindrical housing.

21. The fluid control valve according to claim 1, wherein the base wall opening is a centrally arranged circular through hole.

22. The fluid control valve according to claim 1, wherein the electro-mechanical actuator is a linear actuator.

23. The fluid control valve according to claim 1, wherein the electro-mechanical actuator comprises an actuator piston configured to act on the pilot valve, wherein the actuator piston extends through the fluid control volume.

24. The fluid control valve according to claim 23, wherein the actuator piston is spring loaded towards a retracted state by means of a spring member.

25. The fluid control valve according to claim 24, wherein the spring member is provided between an abutment surface of the actuator piston and an opposing abutment surface of the housing.

26. The fluid control valve according to claim 1, wherein the fluid control volume is delimited by the base wall on one axial side and at least partly by the electro-mechanical actuator on the other axial side.

27. The fluid control valve according to claim 1, wherein the fluid control valve is configured for controlling flow of lubrication oil or cooling fluid in a combustion engine (23).

28. The fluid control valve according to claim 1, wherein the main valve comprises at least one opening through its cylindrical side wall and configured to match at least one of the first and second openings, preferably selectively both of first and second openings, of the housing for controlling the flow of fluid from the fluid inlet to the first fluid outlet and second fluid outlet respectively as a function of the axial position of the main valve.

29. The fluid control valve according to claim 1, wherein an axial abutment surface of the main valve cooperates with an axial abutment surface of the housing for controlling the flow of fluid from the fluid inlet to the first fluid outlet and second fluid outlet respectively as a function of the axial position of the main valve.

30. A heat exchange system comprising a heat exchange fluid circuit having a heat source, a heat exchanger, a heat exchanger by-pass, a fluid pump and a fluid control valve according to claim 1, wherein the fluid control valve controls a ratio of flow through the heat exchanger and the heat exchanger by-pass.

31. A method for adjusting the axial position of a cylindrical main valve of a fluid control valve, the fluid control valve comprising a cylindrical housing with at least one opening through a housing wall, the cylindrical main valve being axially movably arranged inside the housing for controlling a fluid flow through the at least one opening, wherein the fluid control valve further comprises a fluid inlet, a first fluid outlet and a second fluid outlet, wherein the main valve is configured to control a flow of fluid from the fluid inlet to the first fluid outlet and second fluid outlet respectively as a function of an axial position of the main valve, wherein the first fluid outlet is formed by a first opening of the at least one opening through the cylindrical side wall of the cylindrical housing and the second fluid outlet is formed by a second opening of the at least one opening through the cylindrical side wall, wherein the first opening is axially displaced from the second opening, the method comprising extending an actuator piston of an electro-mechanical actuator in a first axial direction for pushing a pilot valve in an opening direction, thereby enabling increased flow of relatively high-pressure fluid to enter a control volume causing combined axial forces acting on the cylindrical main valve in the first axial direction to exceed an axial force acting in a direction opposite the first axial direction, such that the cylindrical main valve moves in the first axial direction to at least partially open or increase a degree of opening of the second opening;

retracting the actuator piston of the electro-mechanical actuator in a direction opposite the first axial direction for enabling the pilot valve to move in a closing direction, thereby decreasing the fluid pressure within the control volume due to a drain flow out of the control volume, causing the axial force acting on the cylindrical main valve in a direction opposite the first axial direction to exceed the combined axial forces acting in the first axial direction, such that the cylindrical main valve moves in the direction opposite the first axial direction to at least partially open or increase a degree of opening of the first opening and to at least partially close or increase a degree of closing of the second opening.

* * * * *